United States Patent [19]

Kochen et al.

[11] Patent Number: 5,652,190

[45] Date of Patent: Jul. 29, 1997

[54] METHOD FOR REGENERATING MAGNETIC POLYAMINE-EPICHLOROHYDRIN RESIN

[75] Inventors: Robert L. Kochen, Boulder, Colo.; James D. Navratil, Simi Valley, Calif.

[73] Assignee: The United States of America as represented by the United States Department of Energy, Washington, D.C.

[21] Appl. No.: 454,770

[22] Filed: May 31, 1995

Related U.S. Application Data

[62] Division of Ser. No. 62,512, May 7, 1993, Pat. No. 5,595,666.

[51] Int. Cl.$^6$ ............................. B01J 20/34; B01J 38/48; B01J 49/00
[52] U.S. Cl. ............................. 502/25; 502/22; 134/29; 210/670; 210/673
[58] Field of Search ............................. 502/22, 25; 134/29; 210/670, 673

[56] References Cited

U.S. PATENT DOCUMENTS

| | | | |
|---|---|---|---|
| 3,092,617 | 6/1963 | Feldt et al. | 521/25 |
| 5,230,805 | 7/1993 | Yates et al. | 210/661 |

*Primary Examiner*—Glenn A. Caldarola
*Assistant Examiner*—In Suk Bullock
*Attorney, Agent, or Firm*—Russell D. Elliott; James H. Chafin; William R. Moser

[57] ABSTRACT

Magnetic polymer resins capable of efficient removal of actinides and heavy metals from contaminated water are disclosed together with methods for making, using, and regenerating them. The resins comprise polyamine-epichlorohydrin resin beads with ferrites attached to the surfaces of the beads. Markedly improved water decontamination is demonstrated using these magnetic polymer resins of the invention in the presence of a magnetic field, as compared with water decontamination methods employing ordinary ion exchange resins or ferrites taken separately.

3 Claims, 9 Drawing Sheets

METHOD FOR REGENERATING MAGNETIC POLYAMINE-EPICHLOROHYDRIN RESIN

This application is a divisional of application Ser. No. 08/062,512 filed May 7, 1993, now U.S. Pat. No. 5,595,666, the entire contents of which are incorporated by reference.

The United States Government has rights in this invention pursuant to Contract No. DE-AC04-76DP03533 between the United states Department of Energy and Rockwell International Corporation.

BACKGROUND OF THE INVENTION

This invention relates generally to decontamination of water, and more particularly, to a method for removing heavy metals and actinides from contaminated water using a magnetic polymer resin, a method for preparation of the resin, the resin itself, and a method for regenerating and reusing the magnetic polymer resin.

Wastes generated by government and industry as a result of the nuclear fuel cycle, nuclear weapons development and production and other industrial processes commonly include water contaminated with various heavy metals and radioactive materials including measurable amounts of actinides. Water decontamination methods available presently fall into two basic types: 1) maximum dilution, and 2) maximum concentration and subsequent removal of the contaminant. Maximum dilution achieves decontamination by dramatically increasing the amount of otherwise inert materials in a contaminated water sample and effectively decreasing contaminant concentration prior to either storage or disposal by release into the environment. Maximum concentration and removal, on the other hand, typically involves water purifications methods including adsorption, ion exchange, chemical precipitation, flocculation, filtration and biological retention. Such purification methods allow for the concentration and removal of contaminants in order that the contaminants may be stored or disposed of in isolated hazardous waste repositories. Varieties of these methods have been used in managing radioactive wastes, nonradioactive wastes and mixed wastes. The present invention involves concentration and removal of contaminants.

It has been demonstrated that mixed valence iron oxide compounds, or ferrites, are effective in removing heavy metals and suspended solids from aqueous media. Due to their unique chemical structure, ferrites may contain one or more iron atoms capable of being replaced by other metal ions. This characteristic, together with ferrites' strongly magnetic character, make them particularly suited to applications associated with waste water decontamination. Toshio Takada, "Removal of Heavy Metal Ions from Waste Water by Fertilization," Koga to Taisaku 13, 37 (1977); Toshiyuki Iguchi, Toyokazu Kamura, and Masahiro Inoue, "Ferrite Process for Treatment of Waste Water Containing Heavy Metals," Poll. Prev. and Dev. Tech. 10, 49 (1979); Tomio Nagashima, "Removal of Hazardous Metals from Waste Water," Japan, Kokai 77 77,465 (1977); Masakatu Sano, "Removal of Hazardous Metals from Waste Water," Japan, Kokai 77 67,156 (1977); Izuru Sugano, "Removal of Hazardous Metals from Waste Water," Japan, Kokai 77 67,154 (1977); Christopher de Latour and Henry Kolm, "Magnetic Separation in Waste Water Pollution Control," IEEE Trans. on Magnetics 11, 1570 (1975). Magnetite, a common ferrite, is a strong adsorbent which has been used successfully for removing organic materials and biological matter such as algae, bacteria, viruses, and seeds from water. Thomas E. Boyd, M. J. Cusick, and James D. Navratil, "Ferrite Separation Science and Technology," Recent Developments in Separation Science, 8, pp. 207–232, N. N. Li and J. D. Navratil, Eds., CRC Press, 1986.

Ferrites have also been demonstrated to be effective in removal of actinides (thorium, uranium, plutonium and americium) from waste water generated at the nation's nuclear weapons production facilities. Ferrite removal of actinides can be accomplished using several different techniques including mixing prepared ferrites with aqueous wastes and preparing ferrites in situ in waste solutions. "Removal of Radioactive Materials from Waste Solutions Via Magnetic Ferrites," Thomas E. Boyd, Robert L. Kochen, and Marlene Y. Price, ANS Topical Meeting on Treatment and Handling of Radioactive Wastes, Richland, Wash. (1982); Robert. L. Kochen, "Actinide Removal From Aqueous Solution with Activated Magnetite," RFP-4100, Rockwell International, Rocky Flats Plant, Golden, Colo. (1987); Thomas E. Boyd, Robert L. Kochen, "Ferrite Treatment of Actinide Waste Solutions: Continuous Processing of Rocky Flats Process Waste," RFP-3476, Rockwell International, Rocky Flats Plant, Golden, Colo. (1983), Thomas E. Boyd, Robert L. Kochen, James D. Navratil and Marlene Y. Price, "Actinide Aqueous Waste Treatment Studies Using Ferrites," Radioactive Waste Management and the Nuclear Fuel Cycle, 4(2), 1983.

A different approach to waste water decontamination involves the use of anion exchange resins for the removal of various contaminants from aqueous media. Polyamine-epichlorohydrin-type resins were first demonstrated to be effective weakly basic anion exchange resins approximately thirty years ago. C. A. Feldt and G. T. Kekish, "Weakly Basic Anion Exchange Resins," U.S. Pat. No. 3,092,617 (1963). Organic ion exchange resins are commonly used in chemical treatment of contaminated water in both industrial waste water treatment and general water resources engineering. Extensive research efforts have been made to develop organic ion exchange resins that are suited to adsorbing particular organic and inorganic contaminants. Alone, however, organic ion exchange resins are not especially effective for purposes of removing actinides from water, especially since noncharged polymeric species can be present in the water.

Due to the fact that large mounts of waste water containing heavy metals, or actinides, or both, are being generated, stored and disposed of in the United States and elsewhere, improved methods for handling and decontaminating such waste water are needed. The present invention helps to serve this need by providing a highly effective means for removing heavy metals and actinides from water.

SUMMARY OF THE INVENTION

The described invention greatly enhances removal of actinide and heavy metal contaminants from water as compared with existing water decontamination processes. By joining magnetic ferrites with polymer resins to produce magnetic ion exchange resins, and by utilizing the resins in the presence of a magnetic field, the invention yields markedly improved decontamination results due to an apparent and unexpected synergism between the individual mechanisms associated with ferrite decontamination systems; ion exchange resins and an external magnetic field.

Accordingly, it is an object of the present invention to provide a method for decontamination of wastes containing water and heavy metals (including, but not limited to cobalt, copper, arsenic, chromium, silver, lead, mercury, and cadmium, and combinations of those metals), beryllium, or actinides, or a combination of them, which utilizes magnetic ferrites, anion exchange resins, and a magnetic field in combinations.

It is another object of the invention to provide a method which exploits the apparent synergism between magnetic ferrites, anion exchange resins, and a magnetic field for purposes of contaminant removal from water.

It is yet another object of the invention to provide a method for preparation of magnetic ion exchange resins.

It is yet another object of the invention to enhance of the decontamination effect by carrying out the method in the presence of a magnetic field.

It is yet another object of the invention to provide magnetic ion exchange resin polymers, themselves.

It is yet another object of the invention to provide a method for regeneration and reuse of spent magnetic polymers.

It is yet another object of the invention to enhance the regeneration of spent magnetic polymers by carrying out the regeneration step outside of the presence of the magnetic field.

Additional objects, advantages and novel features of the invention will become apparent to those skilled in the art upon examination of the following description or may be learned by practice of the invention. The objects and advantages of the invention may be realized and attained by means of the methods, instrumentalities and combinations particularly described in the appended claims.

The foregoing objects and others are accomplished in accordance with the present invention by providing a weak-base polyamine-epichlorohydrin-type anion exchange resin beads with ferrite particles such as magnetite attached to outer bead surfaces. This resin is synthesized by crosslinking polyethyleneimine with ammonia-epichlorohydrin polymer under suspension conditions with a surfactant and an activated magnetite. The result is a magnetic polyamine-epichlorohydrin resin that exhibits good flow-through properties when used in a column mode in the presence of a magnetic field and provides an effective means for removing both heavy metal contaminants and-actinides from water. The objects are also accomplished by providing methods for preparation, use, regeneration and reuse of such a resin as set forth in detail throughout the remainder of this disclosure.

DETAILED DISCUSSION

Significantly enhanced decontamination of water is achieved where ion exchange materials or sorbents are improved by attaching magnetic ferrites to the surfaces of the ion exchangers. A wide variety of magnetic ferrites having the formula $MO.M_2O_3$ may be used. In this case, one M is iron and the other M may be iron, barium, magnesium, calcium or other similar elements. The ion exchangers to which the magnetic ferrites are attached, may include anion or cation exchange polymers, inorganic ion exchangers, sorbents or other materials, such as glass wool, sea sand and the like, which are capable of adsorbing water contaminants and supporting the ferrites. In the preferred embodiment, polyamine-epichlorohydrin resin beads are synthesized with magnetite particles attached to the outer surfaces of the beads.

FIGS. 1(a) through 1(d) illustrate the size and shape of magnetic polyamine-epichlorohydrin (MPE) beads synthesized using the process of this invention. Also shown are iron prints taken of MPE beads depicting the distribution of ferrite particles over the surfaces of the beads. The beads depicted in FIGS. 1(a) through 1(d) range in size from 0.063 mm to just less than 0.125 mm in diameter, however, larger and smaller beads can also be synthesized. A significant advantage associated with these ferrite-coated beads lies in their large surface areas which permits efficient contact between magnetite-embedded resin and contaminated water as it is pumped through the column. The size of beads selected for a particular application depends on desired surface area and flow-through characteristics.

The polyamine-epichlorohydrin resin beads with attached ferrite particles are synthesized using a two-step process. First, epichlorohydrin is slowly added to a stirred aqueous ammonia solution thus promoting an exothermic reaction which yields a clear, transparent ammonia-epichlorohydrin polymer. Following the reaction, this polymer is allowed to cool to ambient temperature.

In the second step, the ammonia-epichlorohydrin polymer is combined with polyethyleneimine (10% aqueous solution) and activated ferrite in a flask containing toluene and a surfactant. This mixture is then stirred at elevated temperature while the azeotropic mixture of water and toluene are refluxed for a period of several hours until magnetic polyamine epichlorohydrin (MPE) resin is produced. The resulting beads may be filtered out of the liquid medium, and then dried and sorted according to size.

Non-magnetic polyamine-epichlorohydrin (PE) resin can also be synthesized using the same procedure, except that no ferrites are added in the second step. PE resin was synthesized in connection with the experiments described below for the purpose of demonstrating the apparent synergism between ferrites in a magnetic field and polyamine-epichlorohydrin resin for purposes of water decontamination.

Figure 1A:
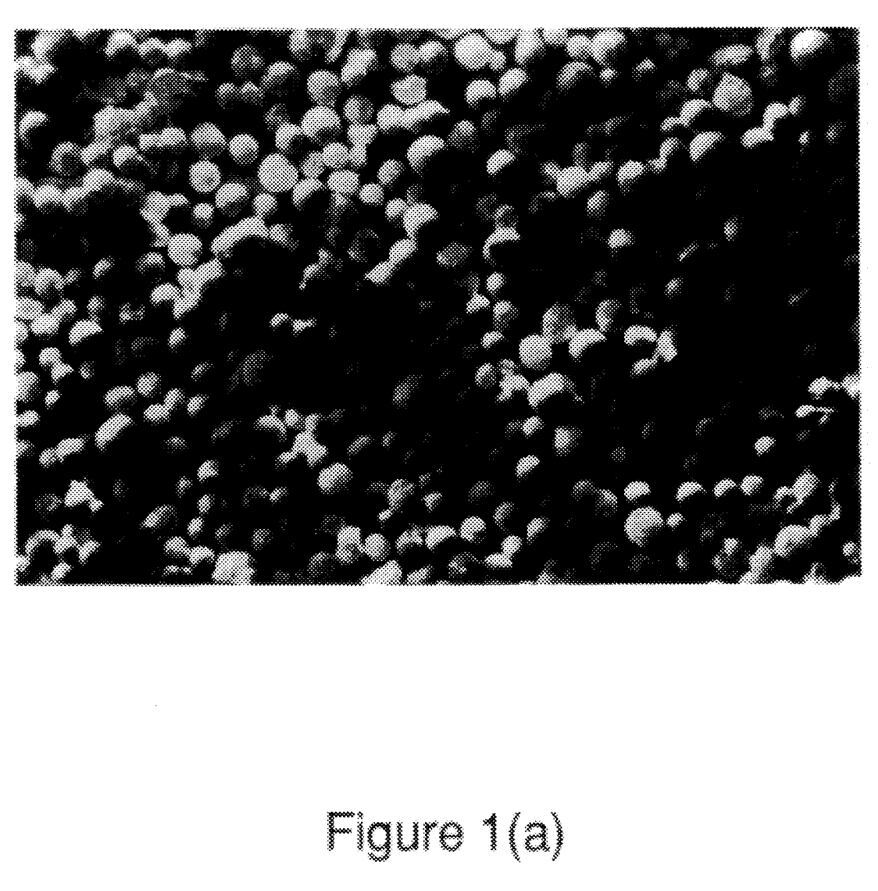
FIG. 1(a) is a photomicrograph of magnetic polyamine-epichlorohydrin resin beads ranging in size from <0.125 to 0.063 mm taken at 50× magnification.
Figure 1B:
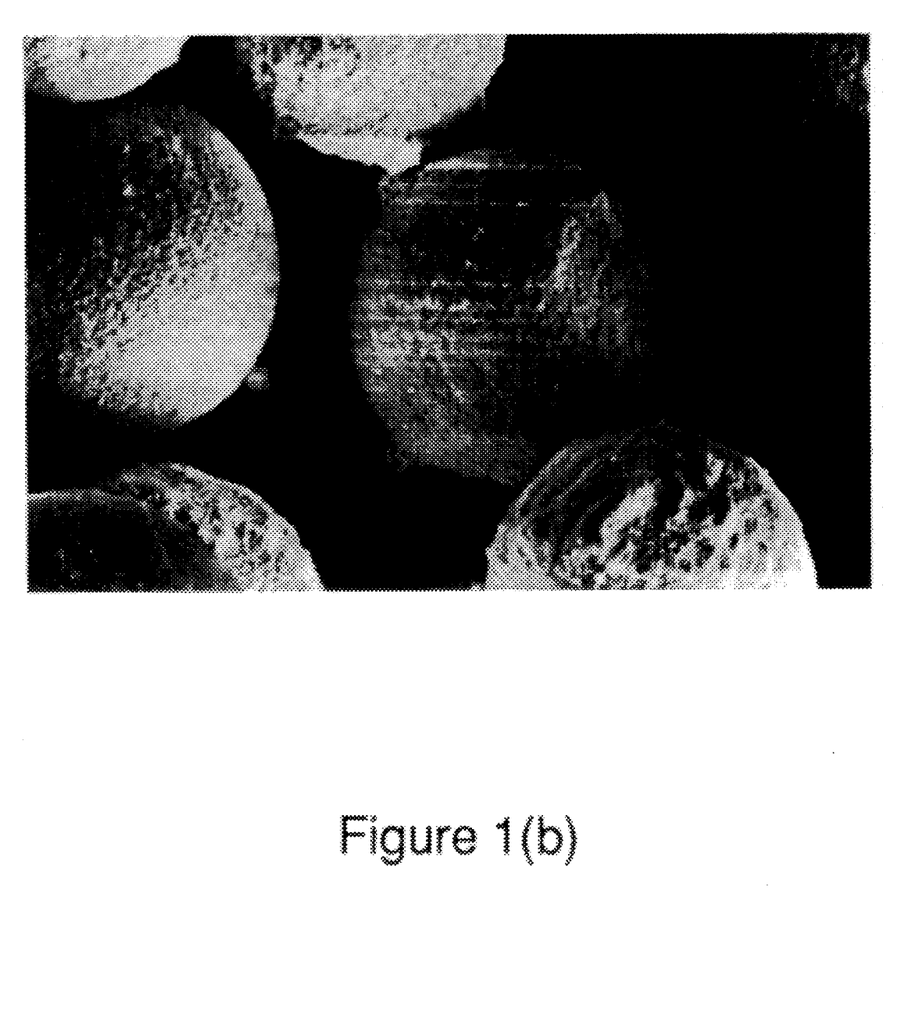
FIG. 1(b) is a photomicrograph of magnetic polyamine-epichlorohydrin resin beads ranging in size from <0.125 to 0.063 mm taken at 500× magnification.
Figure 1C:
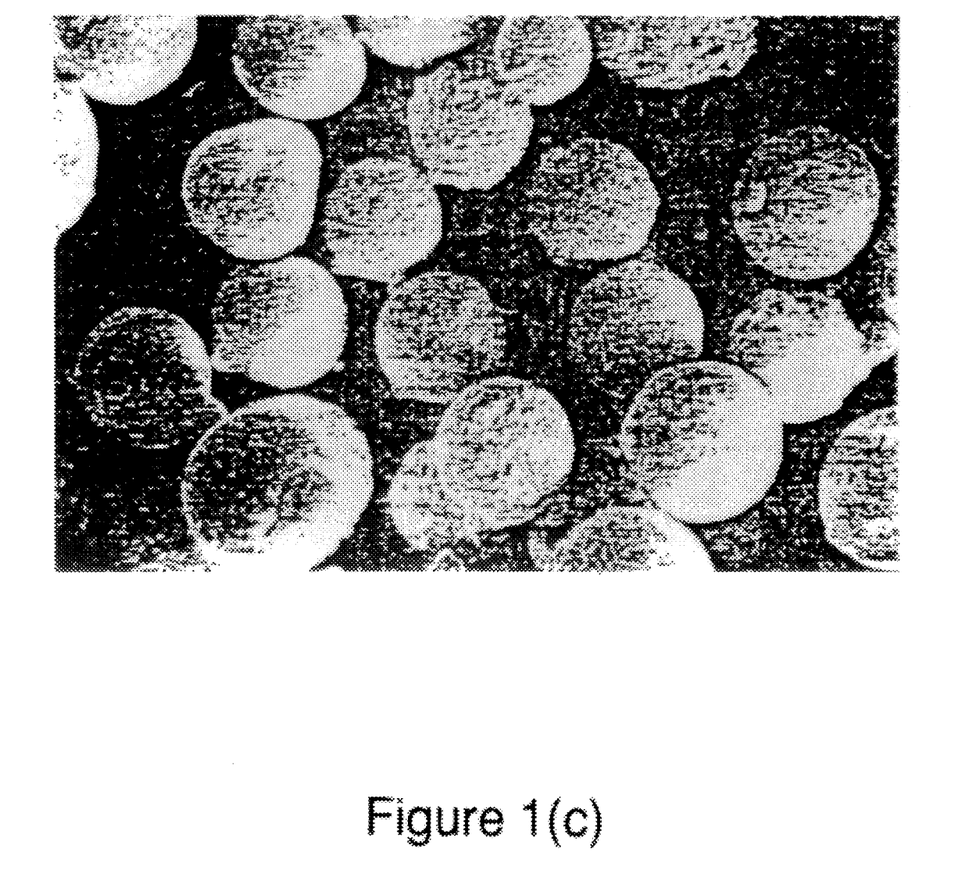
FIG. 1(c) is a photomicrograph of magnetic polyamine-epichlorohydrin resin beads ranging in size from <0.125 to 0.063 mm taken at 200× magnification.
Figure 1D:
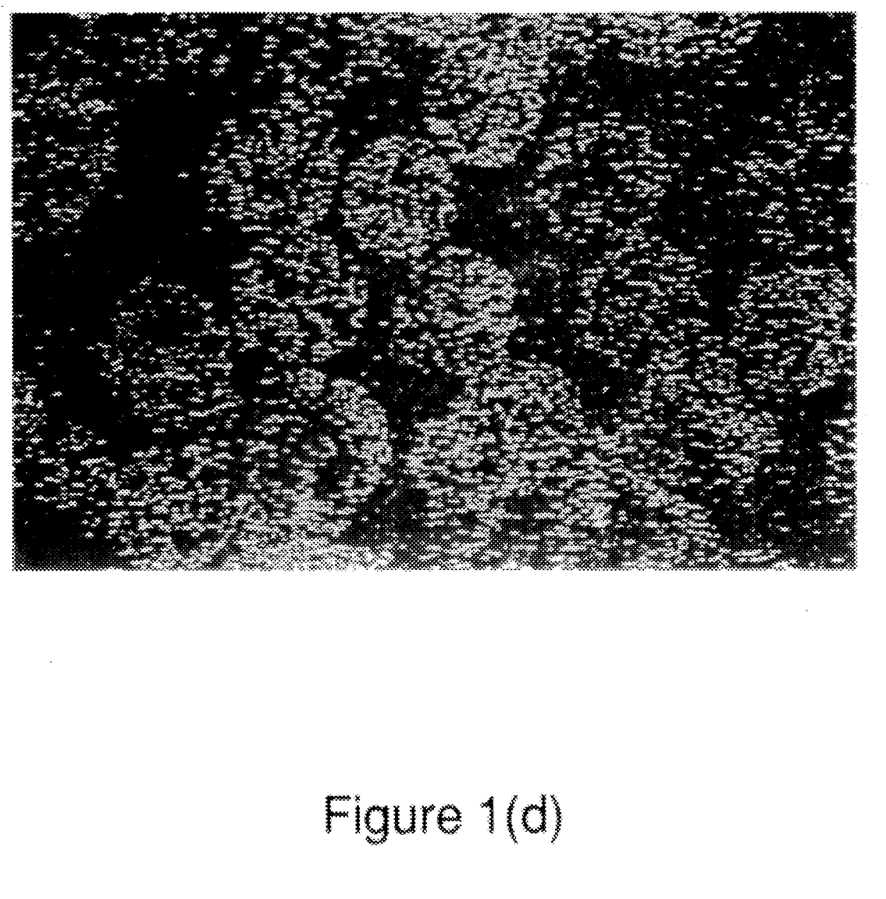
FIG. 1(d) is an iron print of magnetic polyamine-epichlorohydrin resin beads ranging in size from <0.125 to 0.063 mm taken it 200× magnification.
Figure 2:
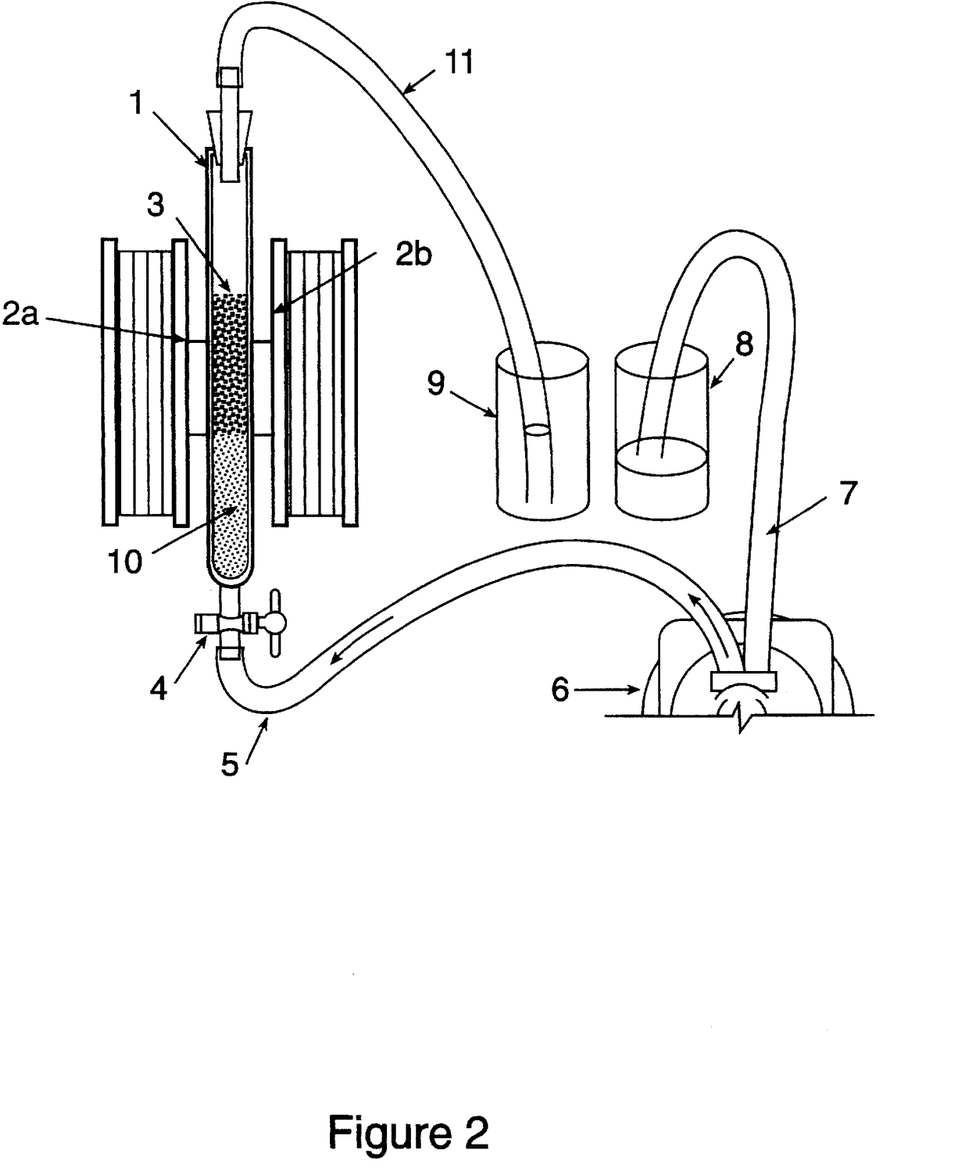
FIG. 2 Shows a schematic drawing of an apparatus preferred for the decontamination method of the invention.

FIG. 2 illustrates the preferred apparatus for practicing the invention. This experimental set-up was used in the examples that follow. According to the preferred embodiment, a vertical glass column (1) is placed between the pole faces (2a) and (2b) of an electromagnet. A piece of stainless steel wool (3) is positioned inside the column, approximately equidistant from both ends, to provide a barrier which is penetrable by liquid, but which is substantially impenetrable to solid beads. At the bottom of the column is positioned a stopcock (4) to which is attached one end of a piece of inlet tubing (5). The opposite end of the inlet tubing is placed in operative association with a pump means (6) which; in turn, is inoperative association with a feeder tube (7) leading to and terminating in a source container (8) bearing contaminated solution. The arrangement of the feeder tube, pump means; and inlet tube is variable according to the type of pump means used. It is necessary only to be able to pump solution from a source container into and through the glass column.

Another section of tubing, an effluent tube (11), is adjoined to the top of the glass column and terminates in an effluent container (9) into which decontaminated solution is permitted to flow. Finally, magnetic polyamine-epichlorohydrin (MPE) resin beads (10) are emplaced in the column above the stopcock and below the stainless steel wool.

According to the preferred method of the invention, MPE resin beads are activated with barium hydroxide and slurried with NaOH solution so as to achieve pH of 12.0. Pretreatment (or activation) of the magnetite surface with hydroxyl ions greatly influences the extent to which the magnetite acts as an actinide adsorbent. Magnetite activated with barium hydroxide is effective over a pH range of 11.0 through 13.5 and lowers plutonium concentrations from $10^{-4}$ to $10^{-8}$ grams per liter. Similarly, sodium hydroxide-activated magnetite lowers plutonium concentrations in water from $10^{-4}$ to $10^{-8}$ grams per liter at pH 12 to 13.

The resin said slurry is then pumped upward into the column while a magnetic field is applied with the electromagnet. When waste solution is not being actively decontaminated and the pump is turned off, the stopcock may be closed to prevent MPE beads from passing out of the bottom of the column.

With the column thus prepared, the stopcock is opened and aqueous solution contaminated with actinides, heavy metals, or both, is pumped into the bottom of the column, and through the slurry of MPE beads. A magnetic field is constantly applied using the electromagnet. As the solution is pumped through the resin bead slurry in the presence of the magnetic field, heavy metal and actinide contaminants adsorb onto the beads. Liquid thus decontaminated then passes upward out of the column, through the effluent tube and into the effluent container.

The mechanism of the adsorption process is complex. Fundamentally, however, the adsorption of cations increases with pH, as the negative charge on the magnetite increases above the isoelectric point of 6.9. D. R. Dixon, *Interaction of Alkaline-Earth-Metal Ions With Magnetite*, Colloids and Surfaces, 13, pp 273–286, 1985. The isoelectric point is the pH at which the positive and negative charges on the molecule are balanced, and the molecule does not move in either direction when placed in an electric field. When pH is lowered below the isoelectric point, the surface charge on the magnetite becomes positive and the cations are released.

After the MPE beads adsorb the contaminants, they can be cleaned and reused. In regeneration, the surface charge on the magnetite can be made positive (for cation release) by treating with mineral acid. Both nitric acid (0.1M and 3.0M) and hydrochloric acid (0.1M and 3.0M) were evaluated for removing actinide activity from MPE resin. The 3.0M HCl was the more effective solution for removing the actinide activity. Removal of the actinides in this fashion from the MPE resin requires that the magnetite be completely dissolved from the resin matrix.

In the preferred embodiment, cleaning of the beads is effected by washing heavy metal and actinide contaminants off of them using either KOH or NaOH at a pH greater than 12.5. MPE beads reactivated in this manner can be reslurried and used again in the same fashion that they were used originally. Besides KOH and NaOH, aqueous solutions of complexing agents, such as EDTA; citrate, and the like, may also be used for elution of the beads.

The decontamination process of the invention may be used to remove beryllium and a wide variety of heavy metals (including cobalt, copper, arsenic, cadium, silver, lead, mercury and cadmium) from aqueous waste. Likewise, actinides such as thorium, uranium, plutonium, americium and others can be effectively removed from aqueous solutions according to this invention. Combinations of these elements can likewise be removed.

Figure 3:
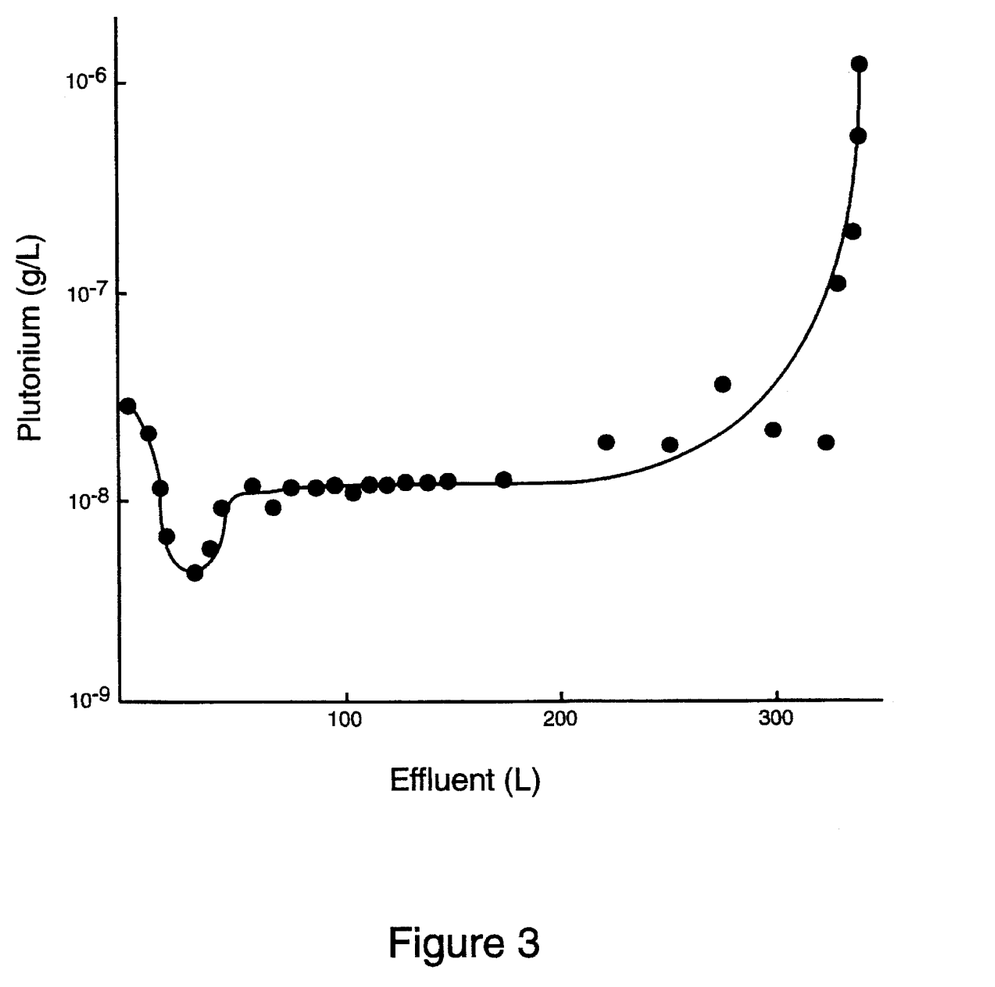
FIG. 3 is a graphic representation of results obtained for plutonium removal using the invention.

Actinide decontamination results are depicted in FIGS. 3, 4, 5 and 6. FIG. 3 shows the results of an experiment in which approximately 350 liters of plutonium-contaminated water were passed through a column such as is described above. The initial plutonium concentration in the contaminated water prior to treatment was $1.28 \times 10^{-4}$ grams Pu-239 per liter and the MPE resin bead size ranged from less than 0.125 mm in diameter to 0.063 mm in diameter. The flow rate upward through the column was 3.5 ml/min./cm² (0.87 GPM/Ft²) with 0.3 Tesla applied to the electromagnet. (It is noted here that varying degrees of decontamination can be accomplished using any field strength within the range of 0.2 to 1.0 Tesla.) The technique by which the MPE resin beads were synthesized is described below in Example 1. For purposes of collecting these data, column effluent was collected in 250 ml aliquots and analyzed for actinide concentration at one-liter intervals. After 270 liters of solution were processed, the effluent was collected in one-liter aliquots and analyzed for actinide concentration at five-liter intervals.

The graph in FIG. 3 shows that the mount of plutonium in the effluent water decreased dramatically at the outset as contaminated water passed through the matrix of MPE resin beads. This indicates that most of the plutonium present in the contaminated water had been trapped by the MPE beads. Only after the beads started to become saturated did the concentration of plutonium in the effluent start to rise. Using the invention, plutonium concentrations in 325 liters of water were lowered from $1.28 \times 10^{-4}$ g/l to $2.77 \times 10^{-8}$ g/l with 20 grams of MPE resin.

Figure 4:
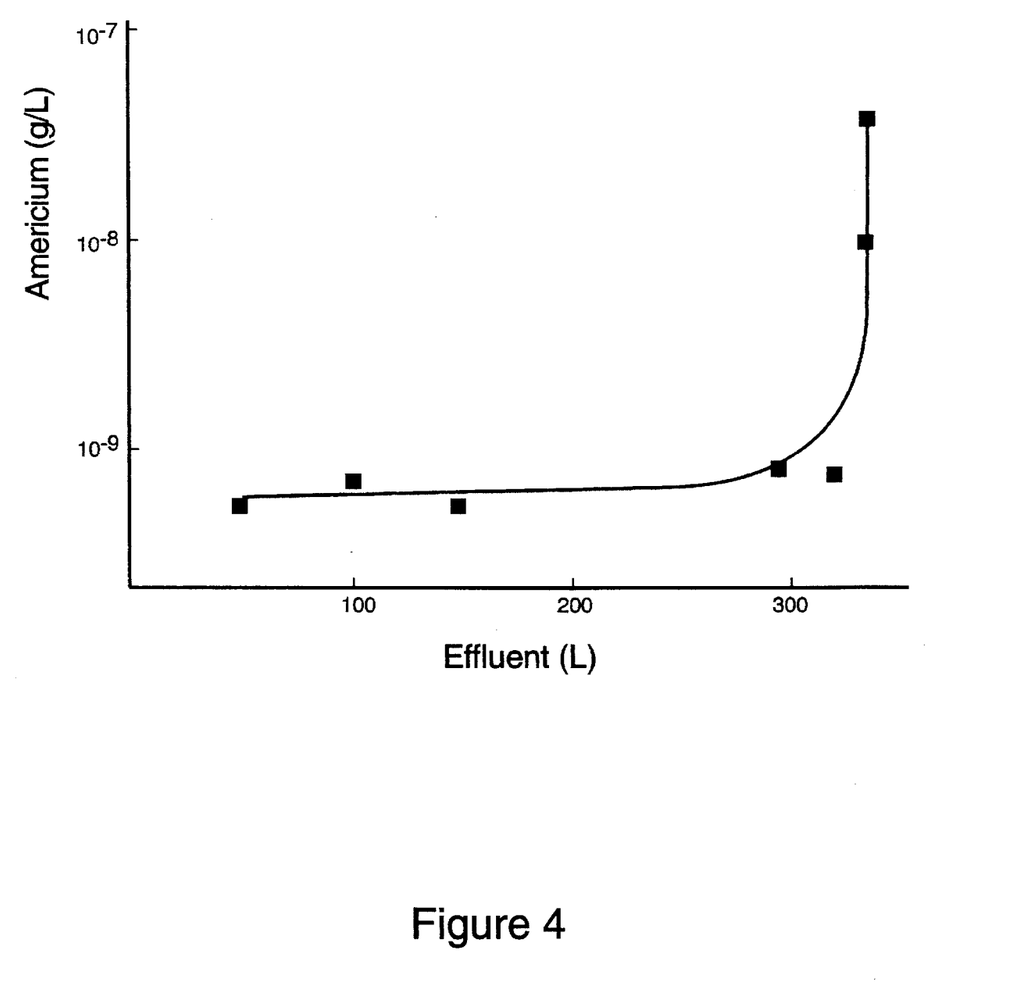
FIG. 4 is a graphic representation of results obtained for americium removal using the invention.

FIG. 4 shows results similar to those depicted in FIG. 3, except that they pertain to the rate of americium removal by MPE resin beads where the initial americium concentration in the water prior to treatment was $3.57 \times 10^{-7}$ grams Am-241 per liter. The remainder of the parameters and the sampling regimen were the same as those stated above for FIG. 3.

Again, very low effluent concentrations of americium were detected until the MPE beads started to become saturated. Using the invention, americium concentrations in 325 liters of water were lowered from $3.57 \times 10^{-7}$ g/l to $7.17 \times 10^{-10}$ g/l with 20 grams of MPE resin.

Figure 5:
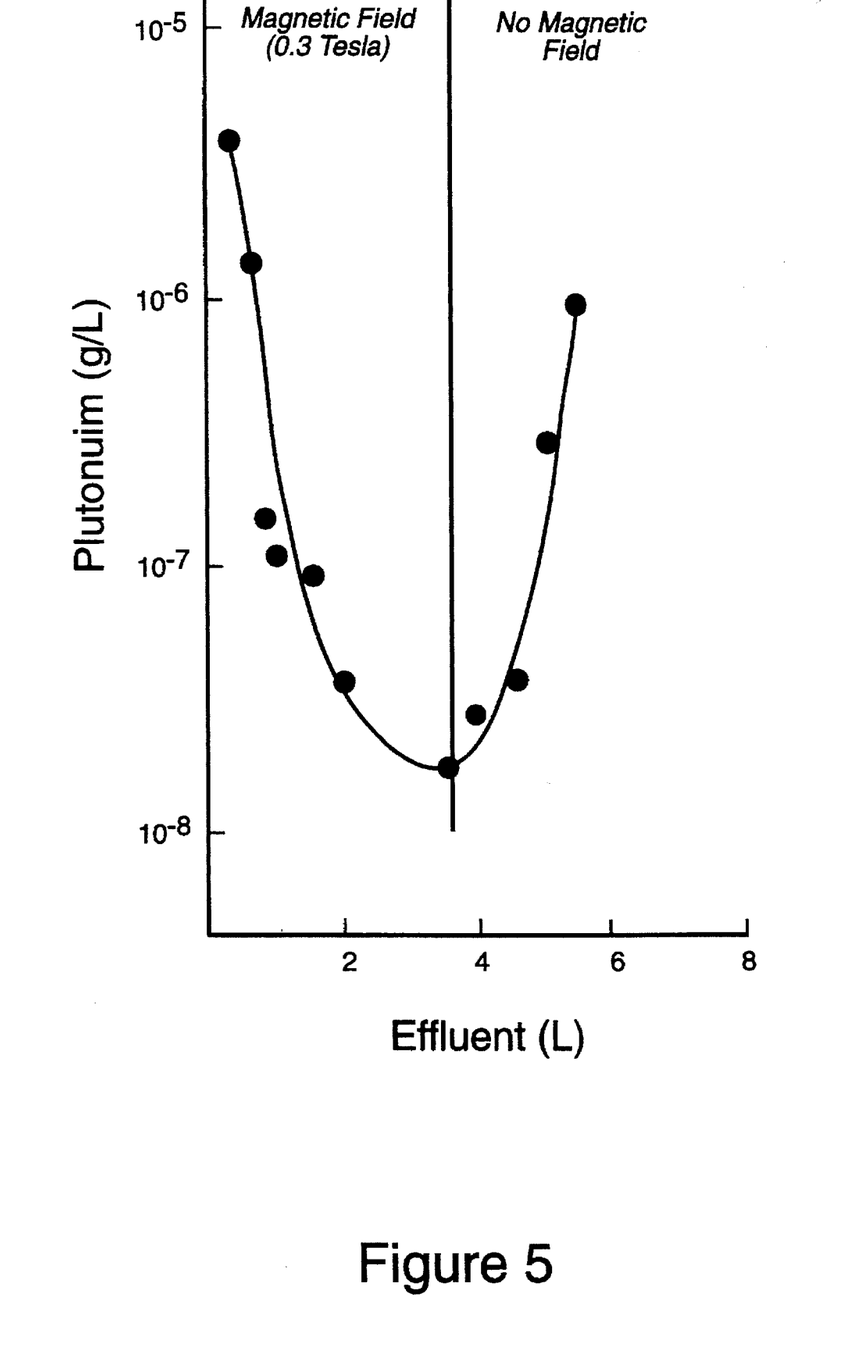
FIG. 5 is a graphic representation comparing results obtained for plutonium removal using magnetic polyamine-epichlorohydrin resin in the presence of a magnetic field versus plutonium removal using the resin in the absence of a magnetic field.

FIG. 5 shows the results of a run wherein MPE resin beads ranging in diameter from less than 0.125 mm to 0.063 mm reduced plutonium concentration in water steadily from approximately $10^{-4}$ g/l to nearly $10^{-8}$ g/l in the presence of a magnetic field with a field strength of about 0.3 Tesla. However, when the magnetic field was removed, the efficacy of the plutonium removal by the MPE beads declined dramatically.

Figure 6:
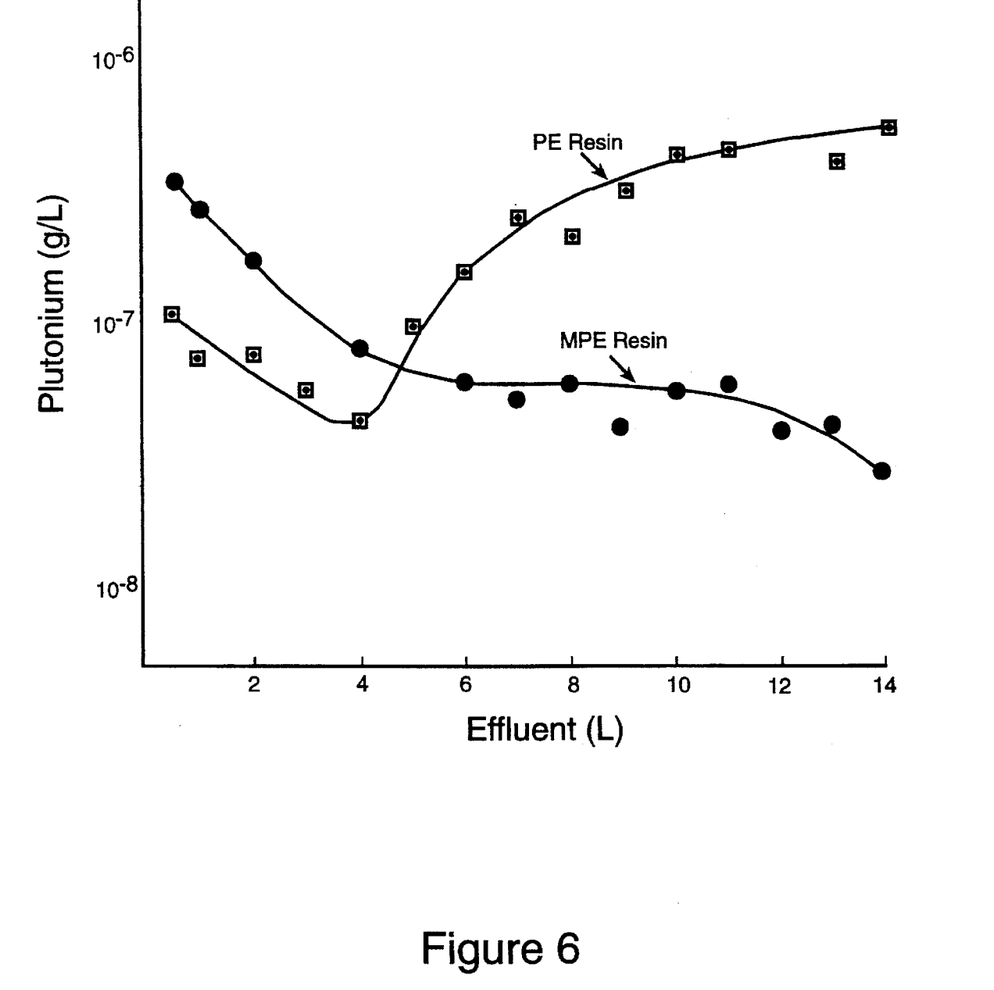
FIG. 6 is a graphic representation comparing results obtained for plutonium removal using magnetic polyamine-epichlorohydrin resin in the presence of a magnetic field versus using non-magnetic polyamine epichlorohydrin resin.

Similarly, FIG. 6 shows the enhanced plutonium removal capability of MPE in comparison with non-magnetic polyamine-epichlorohydrin resin, (PE) in the presence of a magnetic field. In this run, both types of resin were tested for their capability of removing plutonium from contaminated water in the presence of a magnetic field with a field strength of about 0.3 Tesla. Although there was an initial decrease in plutonium concentration with both types of resin, the capability of PE to remove plutonium diminished quickly. The MPE, on the other hand, reduced plutonium contamination to lower concentrations than did the PE, and the MPE remained effective for treating a significantly larger volume of plutonium contaminated water.

Ferrites alone can also be used to remove actinides from water, although they are less effective than MPE in the presence of a magnetic field. Using the invention, 8,600 liters of actinide-contaminated water can be successfully treated with one liter of MPE resin. (The density of wet MPE resin is 0.53 g/cm$^3$.) Two grams of magnetite are required to treat one liter of waste water by lowering plutonium concentration from $10^{-4}$ g/l to $10^{-8}$ g/l. Thomas E. Boyd and Robert L. Kochen, "Ferrite treatment of Actinide Waste Solutions: Continuous processing of Rocky Flats Process Waste," RFP-3476, Rockwell International, Rocky Flats Plant, Golden Colo., Mar. 18, 1983. Typically, therefore, 650 grams of activated magnetite would be required to lower plutonium concentration in 325 liters of water from $10^{-4}$ g/l to $10^{-8}$ g/l. Similar results have been demonstrated with only 20 grams of MPE resin.

The present invention's capability, of highly effective removal of actinides depends on an apparent synergistic effect involving the combination of both polyamine-epichlorohydrin resin and ferrites in the presence of a magnetic field. Neither PE resin alone nor ferrites alone can achieve comparable results given similar conditions.

Without further elaboration, it is believed that one skilled in the art can, using the preceding description, utilize the present invention to its fullest extent. The following examples are to be construed as merely illustrative and not limitative of the remainder of the disclosure in any way whatsoever.

EXAMPLE 1

Resin Preparation: Polyamine-epichlorohydrin resin beads are synthesized with ferrite particles attached to the outer bead surfaces. First, 1.7 moles (103 g) of aqueous ammonia solution (28%) are placed into a one-liter three-necked flask. The flask is equipped with a mechanical stirrer, a thermometer, and a 125-ml dropping funnel. One mole (92.5 g) of epichlorohydrin is added by drops through the dropping funnel to the aqueous ammonia solution being stirred at 500 rpm. The epichlorohydrin is added over a one-hour period with the rate of addition sufficient to maintain an exothermic reaction temperature of 90°±2° C. At the end of the one-hour period, a clear, transparent polymer (ammonia-epichlorohydrin) is removed and cooled to ambient temperature (23°±2° C.).

Next, 95.0 g of previously prepared ammonium-epichlorohydrin polymer, 58.0 g polyethyleneimine (10% aqueous solution), and 9.0 g of wet, activated ferrite (in this case, magnetite) are added to a one-liter three-necked flask that contains 150 ml of toluene and 4.5 g Aersol™ GPG surfactant. The flask is equipped with a heating mantel, a thermometer, a mechanical stirrer, a Friedricks™ condenser (350-mm), and a Barrett™ water trap (20-ml).

Then, the mixture is stirred for five minutes at 1700 rpm and an additional 5 g of epichlorohydrin is added to the flask. The, temperature is raised to 85°±2° C. and the mixture is then allowed to stir at 1000 rpm while an azeotropic mixture of water and toluene are refluxed. Additional toluene (about 350 ml) is added as needed to allow the refluxing to continue. The refluxing is sustained for 4.5 hours and the water is removed as necessary from the Barrett™ trap. At the end of the heating period, the product, a magnetic polyamine-epichlorohydrin resin, is cooled, filtered through Whatman™ No. 41 (20–25 micron) filter paper, air dried and sieved.

EXAMPLE 2

Column preparation: The upper potion of a glass chromatographic column (19 mm i.d×25 cm)is packed with a 10 cm plug of free, No. 431 stainless steel wool. The column is then placed between the poles of an electromagnet such that the bottom portion of the steel wool plug is positioned amid the two poles. (Glass wool can be used in place of the stainless steel wool.) The bottom of the column is fitted with a stopcock and the top of the column is fitted with a rubber stopper and exit tube. Tygon™ tubing is attached to both ends of the column.

Next, the magnetic polyamine-epichlorohydrin (MPE) resin is activated by stirring it with a solution of barium hydroxide (2.6 mmol per gram of magnetite) for 10 minutes at ambient temperature. The excess barium hydroxide solution is then decanted and sodium hydroxide solution (pH 12.0) is added to the wet MPE resin. This MPE slurry is then pumped (up-flow at 10 ml per minute via a peristaltic pump) into the glass column while a field strength of 0.3 Tesla (3,000 Gauss) is applied by the electromagnet. This results in a high-gradient magnetic effect that is responsible for the high efficiency removal of heavy metal and actinide ions from the water. The magnetic field also helps to ensure that the magnetic resin remains in the column while fluid is allowed to flow through.

We claim:

1. A method for regenerating used magnetic polyamine-epichlorohydrin resin comprising the steps of:
   providing used magnetic polyamine-epichlorohydrin resin with cationic contaminants adhering to it surface;
   washing said resin with a base.
2. The method of claim 1 wherein said base is KOH.
3. The method of claim 2 wherein said base is NaOH.

* * * * *